May 10, 1955     T. M. CHAPMAN     2,707,832
CARPENTER'S SELF CALCULATOR
Filed June 18, 1953     2 Sheets-Sheet 1
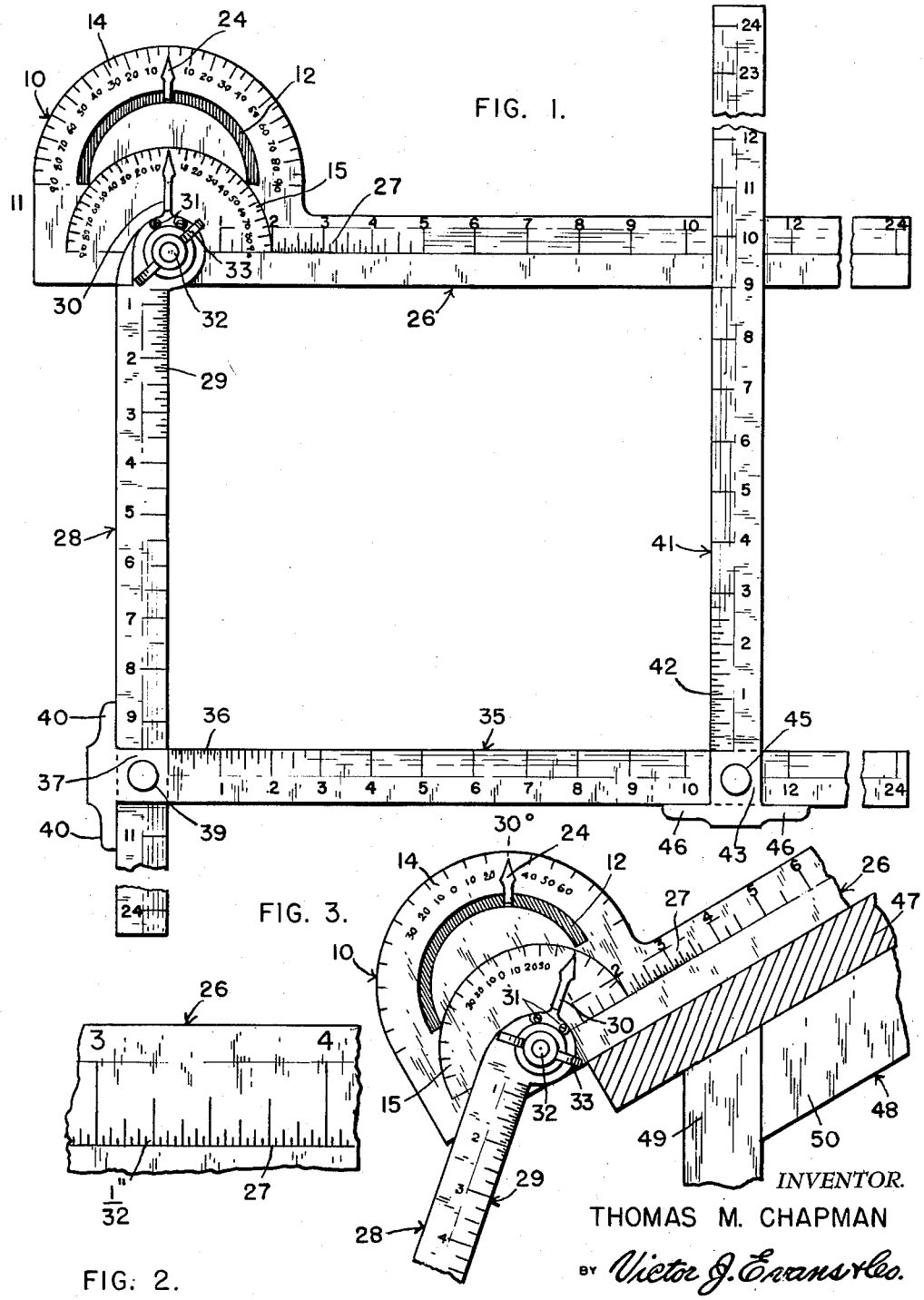
INVENTOR.
THOMAS M. CHAPMAN
BY *Victor J. Evans & Co.*
ATTORNEYS May 10, 1955  T. M. CHAPMAN  2,707,832
CARPENTER'S SELF CALCULATOR
Filed June 18, 1953  2 Sheets-Sheet 2

*INVENTOR.*
THOMAS M. CHAPMAN
BY *Victor J. Evans & Co.*
ATTORNEYS

United States Patent Office 2,707,832
Patented May 10, 1955

2,707,832
CARPENTER'S SELF-CALCULATOR

Thomas M. Chapman, Wortham, Tex., assignor of one-half to Billie Swindall, Coryell County, Tex.

Application June 18, 1953, Serial No. 362,465

4 Claims. (Cl. 33—97)

This invention relates to a calculating instrument, and more particularly to a calculating instrument for use by carpenters and the like.

The object of the invention is to provide a calculating instrument which will automatically indicate to the user the pitch or slope of a roof as well as the length of rafters, studs, and run.

Another object of the invention is to provide a carpenter's self-calculating instrument which will permit the user to readily ascertain the area of a rectangle, or to ascertain the dimensions of other shapes or objects.

A further object of the invention is to provide a carpenter's self-calculator which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view of the self-calculator, constructed according to the present invention.

Figure 2 is a fragmentary enlarged view showing the scale markings on one of the rules or members.

Figure 3 is a fragmentary elevational view showing the instrument being used for determining or measuring the pitch of a roof.

Figure 4:
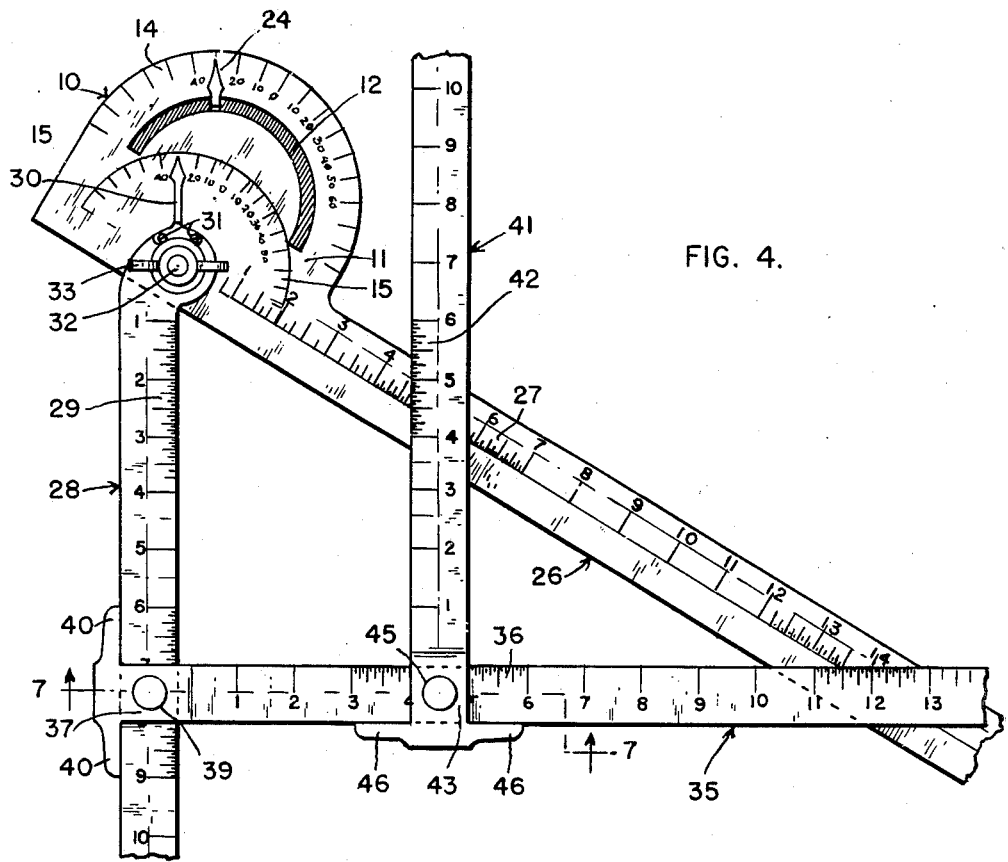
Figure 4 is a view similar to Figure 1, but showing the parts in adjusted position after the pointer has been set to the angle or pitch as determined in Figure 3 so as to permit the reader or user to ascertain the run of the roof, the length of rafters, or the length of studs.

Referring in detail to the drawings, the numeral 10 designates a hollow housing which may be fabricated of any suitable material, and the housing 10 includes an end wall 11 and a side wall 16. The end wall 11 is provided with an arcuate slot 12 for a purpose to be later described, and arranged on the outside surface of the end wall 11 is a pair of protractor scales 14 and 15, Figure 4. A plate or cap 17 is detachably connected to the housing 10 by suitable bolts or screws 18.

An adjustable jewel bearing 19 is carried by the plate 17, and a lock nut 20 is provided for maintaining the bearing 19 immobile in its adjusted positions. A bearing member 21 is mounted in the end wall 11, and a shaft 22 extends between the bearing member 21 and the jewel bearing 19. A pointer 23 is movably supported by the shaft 22, and the pointer 23 includes an offset portion 24 that extends through the slot 12 for coaction with the protractor scale 14, Figures 4 and 5. A weight 25 is arranged on the other end of the swingable or movable pointer 23, and the weight 25 insures that the pointer 23 will always remain vertically disposed.

Extending from the housing 10 and secured thereto or formed integral therewith is an elongated graduated body member 26 which has scale markings 27 thereon. Pivotally connected to the housing 10 is an elongated graduated support member 28 which has scale markings or indicia 29 thereon. For pivotally connecting the support member 28 to the housing 10, a bolt 32 extends from the end wall 11 through a suitable aperture or opening 34 in the support member 28, Figure 5. A wing nut 33 is arranged in threaded engagement with the outer portion of the bolt or pin 32. By loosening the wing nut 33, the support 28 can be pivoted relative to the body member 26 and after the parts have been pivoted to the desired position, the wing nut 33 can be tightened to maintain the parts steady in their adjusted positions. A pointer 30 is secured to the end of the support member 28 by suitable screws 31, and the pointer 30 is adapted to coact with the protractor 15 for a purpose to be later described.

The calculator of the present invention further includes a rule 35 which is provided with markings 36 thereon. A bracket 37 is arranged on one end of the rule 35, and the bracket 37 is provided with a slot 38 for slidably receiving the support member 28, Figure 7. A set screw 39 extends through the bracket 37 and into engagement with the support member 28 for maintaining these parts immobile in their various adjusted positions. Flanges or lips 40 may be arranged contiguous to the bracket 37 on the end of the rule 35 for maintaining the rule 35 in its proper aligned position at right angles with respect to the support member 28.

There is further provided a second rule 41 which is arranged in spaced parallel relation with respect to the support member 28, and the rule 41 is slidably connected to the rule 35. The rule 41 has graduations 42 thereon, and the rule 41 includes a bracket 43 that has a slot 44 for slidably receiving the rule 35. A set screw 45 extends through the bracket 43 for engaging the rule 35 to maintain the parts immobile in their adjusted positions. Flanges 46 are arranged on the end of the rule 41 to maintain the rule 41 in its proper aligned position with respect to the rule 35.

In Figure 3 the present invention is shown being used for determining the pitch of a roof 47 of a building 48. In Figure 3 the numeral 49 designates one of the studs while the numeral 50 designates a rafter. It will be seen that the scale markings on each of the body member, support member, and rules are graduated in units of 1/32 of an inch.

Figures 5, 6, 7:
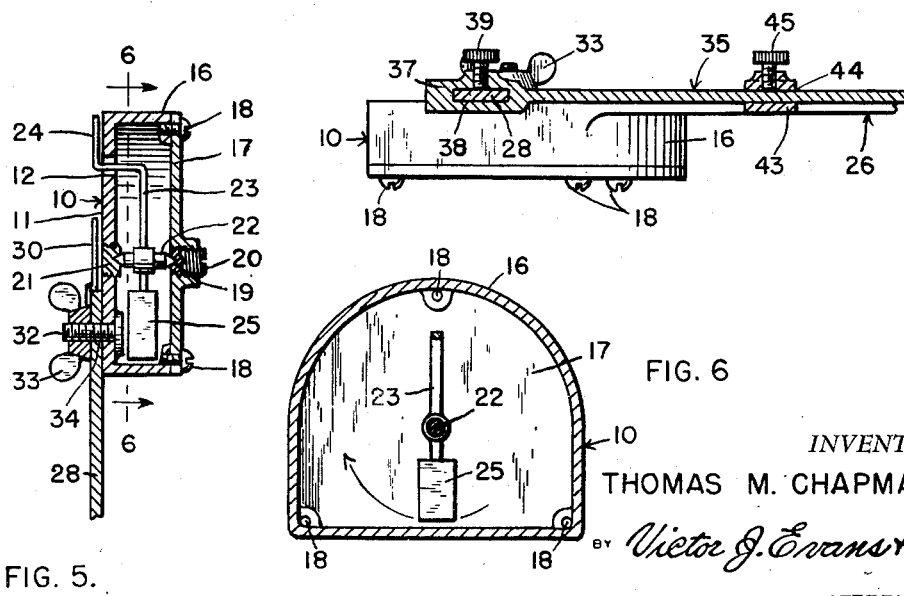
Figure 5 is a fragmentary sectional view taken through the housing and showing the movable pointer with the weight thereon.
Figure 6 is a sectional view taken on the line 6—6 of Figure 5.
Figure 7 is a sectional view taken on the line 7—7 of Figure 4.

From the foregoing it is apparent that a calculating instrument has been provided which is especially suitable for use by carpenters in calculating the pitch or angle of slope of a roof, as well as the run of a building or the length of rafters, studs and the like. In use, the pitch of the roof is determined as shown in Figure 3 by placing the body member 26 along the roof 47. Due to the swinging pointer 23 and the weight 25, the pointer offset portion 24 will indicate on the protractor scale 14 the pitch of the roof automatically. As shown in Figure 3 as an example the offset portion 24 points to 30 degrees which is the pitch of the roof 47. Next, the pointer 31 is set at 30 degrees on the protractor 15 as shown in Figure 4 and then the rule 35 is moved along the support member 28 the proper length as for example the length of the center pole or stud of the building. Then, the run of the roof is read on the scale 36 on the rule 35, and the length of the rafter is automatically read on the scale 27 of the rule 26. The length of the stud is automatically read on the scale 42 of the rule 41.

As previously stated by laying the body member 26 on the roof 47, as shown in Figure 3, the pitch of the roof is read on the protractor 14 because the pointer 23 always stands up straight due to the weight 25. In use the pitch of the roof is first ascertained as shown in Figure 3 and then the wing nut 33 is loosened so that the pointer 31 can be set at the angle of pitch on the scale 15. Then, by moving the rule 41 along the rule 35, the length of the studs can be read on the scale 42 and the run of the roof can be read on the scale 36. It is only necessary for the user to know the pitch of the roof and the length of the center stud or length of a rafter in starting the calculations. The various scales may be divided into 1/32 of an inch and these scale markings may be used to give the proportionate amount of feet for the various members being measured or calculated. The weighted indicator 23 operates by gravity and indicates the slope or pitch of a roof when resting thereon. The determination of the pitch of the roof is the first step in the practical application of the present invention and after the pitch of the roof has been determined, then the run of the roof which is half of the gable width is read on scale 36. The rise of the roof is read upon scale 29. By means of the present invention the length of studs supporting the roof at given points can be determined and also the measurements of hip rafters for supporting the roof can be determined. The parts of the apparatus can be made in any desired length and the scaling can be varied as desired. The two protractors 14 and 15 have the zero mark in the center thereof and the parts can be made of any suitable material, as for example stainless steel. The previously mentioned calculations are based upon knowing the angle of a right triangle and the altitude of one of the legs so as to permit automatic calculation of the other parts of the triangle. The parts can be arranged as shown in Figure 1 so as to form parallelograms or quadrilaterals so that the various dimensions thereof can be determined quickly and accurately.

I claim:

1. A calculating instrument comprising a body member having scale markings thereon, a hollow housing mounted on an end of said body member and including an end wall and a side wall, said end wall being provided with an arcuate slot, a plate detachably connected to said side wall, a pair of spaced apart graduated protractor scales arranged on the outside of said housing, a shaft extending between said plate and end wall, a swinging pointer mounted on said shaft and including an offset portion extending through said slot for coaction with one of said protractors, a weight connected to said pointer and positioned in said housing, a support member having scale graduations thereon pivotally connected to said housing, a pointer secured to an end of said support member for coaction with the other of said protractor scales, a first graduated rule arranged at right angles with respect to said support member and provided with a bracket for slidably engaging said support member, and a second graduated rule arranged in spaced parallel relation with respect to said support member and including a bracket for slidably receiving said first rule.

2. The apparatus as described in claim 1, and further including means for maintaining said first and second rules immobile in their adjusted positions.

3. The apparatus as described in claim 1, and further including flanges arranged on an end of said rules for maintaining the rules in their proper aligned positions.

4. A calculating instrument comprising a body member having scale markings thereon, a hollow housing mounted on an end of said body member and including an end wall and a side wall, said end wall being provided with a slot, a plate connected to said side wall, a pair of graduated protractor scales arranged on the outside of said housing, a shaft extending between said plate and end wall, a swinging pointer mounted on said shaft and including a portion extending through said slot for coaction with one of said protractors, a weight connected to said pointer and positioned in said housing, a support member having scale graduations thereon pivotally connected to said housing, a pointer secured to said support member for coaction with the other of said protractor scales, a first graduated rule provided with a bracket for slidably engaging said support member, and a second graduated rule including a bracket for slidably receiving said first rule.

References Cited in the file of this patent

UNITED STATES PATENTS

| 955,799 | Holbrook | Apr. 19, 1910 |
| 1,972,122 | Woodyard | Sept. 4, 1934 |

FOREIGN PATENTS

| 26,627 | Austria | June 1, 1906 |